Nov. 4, 1958   A. F. CRONE   2,858,748
LOAD TRANSFER DEVICE FOR HIGHWAY JOINTS
Filed Oct. 23, 1953   3 Sheets-Sheet 1
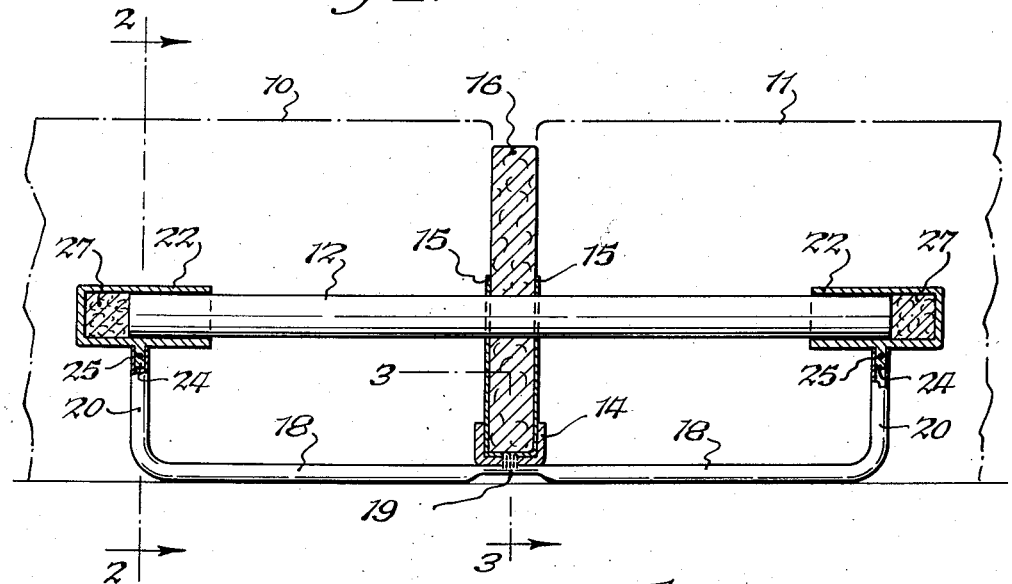
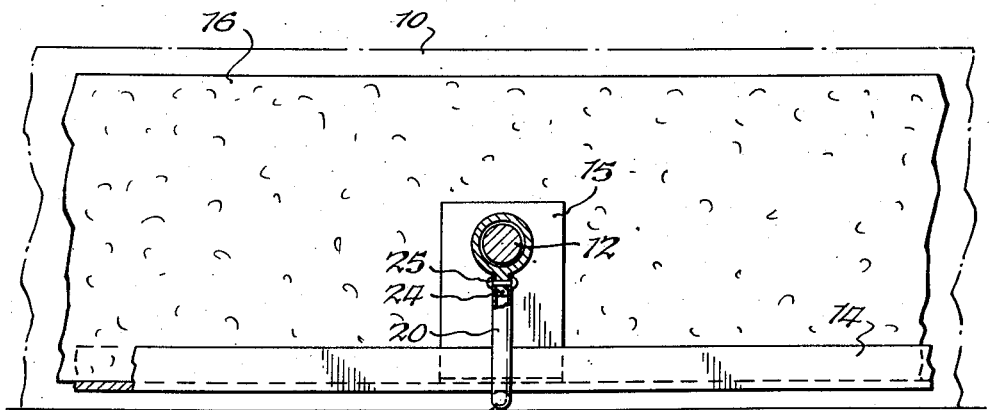
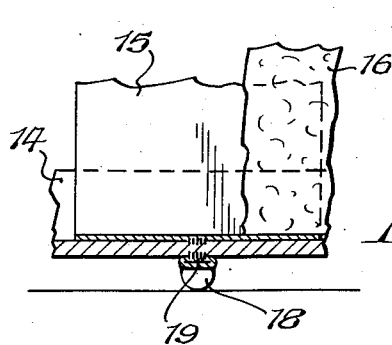
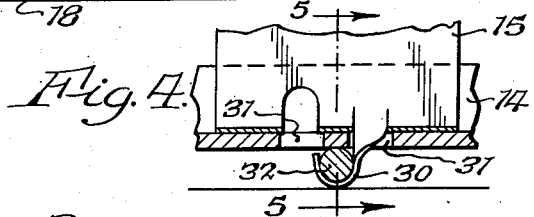
INVENTOR.
Alfred F. Crone
BY
Parker Prochnos Farmer
Attorneys.

Nov. 4, 1958 A. F. CRONE 2,858,748
LOAD TRANSFER DEVICE FOR HIGHWAY JOINTS
Filed Oct. 23, 1953 3 Sheets-Sheet 2

INVENTOR.
Alfred F. Crone
BY
Parker, Crodinson & Farmer,
Attorneys.

Nov. 4, 1958 A. F. CRONE 2,858,748
LOAD TRANSFER DEVICE FOR HIGHWAY JOINTS
Filed Oct. 23, 1953 3 Sheets-Sheet 3

INVENTOR.
Alfred F. Crone,
BY Parker, Rodman & Parma
Attorneys.

United States Patent Office 2,858,748
Patented Nov. 4, 1958

2,858,748

LOAD TRANSFER DEVICE FOR HIGHWAY JOINTS

Alfred F. Crone, Williamsville, N. Y.

Application October 23, 1953, Serial No. 387,836

3 Claims. (Cl. 94—8)

This invention relates to improvements in load transfer devices for highway joints of the type used in highway construction between adjacent pavement slabs to maintain surface alinement of the adjacent slabs. This invention more particularly refers to load transfer devices of the kind in which dowels are provided which are embedded in adjacent ends of the slabs.

In load transfer devices of this type as heretofore constructed and which include a relatively large number of welded joints between various parts of the structure, difficulty has occurred because of breaking of the welded joints during transport and handling of the load transfer devices, which has made it necessary to provide a welder and a welding outfit on the site at which the load transfer devices were to be installed. I have found that this breakage is largely due to the fact that these load transfer devices are very flexible so that when they are lifted at opposite ends or subjected to shocks during transport, the welds are very apt to break.

One of the objects of this invention is to provide a load transfer device of improved construction which overcomes the weaknesses of load transfer devices as heretofore made. A further object is to provide load transfer device which is so constructed that the parts of the same may be readily assembled in the field, thus permitting the joint filler to be shipped separately from the supporting and load transfer parts. Another object is to provide load transfer devices in which the number of welded joints may be greatly reduced, and in which the welded joints which are employed are so arranged that breakage of the same during shipment is prevented or reduced to a minimum. It is also an object of this invention to provide load transfer devices which are so constructed as to be relatively rigid, thus reducing the strains on these devices during transportation. A further object is to provided load transfer devices of this type with caps of improved construction into which the ends of the dowels may extend.

Other objects and advantages will be apparent from the following description of one embodiment of the invention and the novel features will be particularly pointed out hereinafter in connection with the appended claims.

In the accompanying drawings:

Fig. 1 is a transverse sectional elevation of a load transfer device embodying this invention and showing the same applied to adjacent pavement slabs.

Fig. 2 is a sectional elevation thereof, on line 2—2, Fig. 1.

Fig. 3 is a fragmentary sectional elevation thereof, on line 3—3, Fig. 1.

Fig. 4 is a view similar to Fig. 3, but showing a slightly modified construction.

Figure 5:
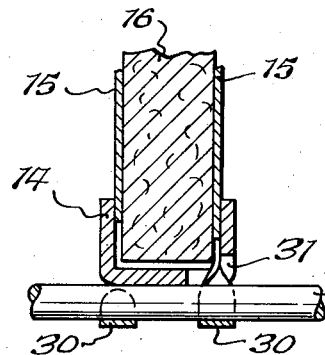
Fig. 5 is a fragmentary section thereof, on line 5—5, Fig. 4.

In the accompanying drawings, in which a few embodiments of my invention are shown by way of examples, 10 and 11 represent two slabs of concrete to the adjacent ends of which my improved load transfer device is applied, and 12 represents dowels which are used to transfer loads from one slab to the other, and to keep these upper surfaces of these slabs in alinement when the wheels of heavy trucks pass from one slab to the other. A plurality of these dowels is used, spaced at intervals lengthwise of the pavement joint. These dowels are generally arranged approximately midway between the upper and lower surfaces of the pavement slabs and means must be provided to support these dowels in such position prior to and during the pouring of the concrete or other road material. The structure for supporting these dowels and other parts of a load transfer device in correct relation to the subgrade of a pavement, according to my invention, and to each other, may be as follows:

In order to provide sufficient rigidity to the load transfer device, I provide a suitable base member which extends lengthwise of the device and which is formed to resist flexing of the same. In the construction shown for this purpose in Figs. 1 to 5, 14 represents the base member of the load transfer device which may be made of any suitable shape and material, preferably having horizontal and vertical webs, and as shown in Figs. 1 to 5, this base member is in the form of a channel arranged with its legs extending upwardly. Preferably the channel is made of rolled steel and extends substantially throughout the length of the load transfer device.

The dowels 12 are supported by means of the base member 14 in any suitable or desired manner, and in the construction shown in Figs. 1 to 5, which show my improvements applied to an expansion joint, the middle portions of the dowels are supported from the base member by means of upright members 15 secured at their lower ends to the base member and provided with apertures through which the dowels 12 extend for supporting the middle portions of the same. In the construction illustrated in Figs. 1 to 5, each upright supporting member is made of sheet metal and is preferably of U-shape, having the lower portion thereof formed to enter into the channel-shaped base member 14. 16 represents the usual elastic or compressible joint filler and the opposite sides or legs of the upright member 15 are so spaced that the joint filler may enter between the two upright legs of each upright member, as clearly shown in Figs. 1 and 5. While I have shown one of these upright members for each dowel, it will be obvious that, if desired, the upright members may be made longer to support two or more dowels.

It is, of course, the function of a load transfer device to correctly support the dowels as well as the joint filler in correct relation to a subgrade of a pavement before and during the pouring of the concrete or other road material on opposite sides thereof, and it is also desirable to provide means for supporting the opposite ends of the dowels so that they will be securely held in correct relation to the pavement. For this purpose, I have provided support or cross members 18 which serve both of these purposes. These members have an elongated bottom portion formed to lie on the subgrade of a highway and upwardly extending end portions which terminate adjacent to the ends of the dowels and are suitably connected therewith. These supports are, consequently, of substantially U-shape, the middle of the horizontal portion being suitably secured to the base member, for example, by means of welding 19 as shown in Figs. 1 to 3, and the upwardly extending end portions or arms 20 at opposite ends thereof are formed to support tubular members or caps 22 into which the ends of the dowels extend. The support members may be made of any suitable or desired material, but as shown in Figs. 1 to 3, they are made of tubing and in the middle portion of each support member the tubing is preferably collapsed or flattened as shown in Figs. 1 and 3 to form a substantially flat bearing surface resting against the bottom face of the base member 14 so that a rigid connection between the base member and supporting member 18 results.

The tubular members or caps 22 may be made of any suitable or desired construction, those shown may be made of cast metal of such internal diameter as to provide a sliding fit on the dowels 12. Preferably if the supports 18 are made of tubing the dowel caps are provided with small studs 24 formed to fit into the ends of the tubing at the upper ends of the arms 20 and the caps will be held on the upright parts 20 of the tubing by means of pins or the like 25 extending through registering holes in the tubing and the studs 24. 27 represents pads of compressible material to fit into the inner ends of the caps 22, and if desired, these pads 27 may be the parts which are removed from the upright joint filler 16 in cutting holes through the same through which the dowels 12 may pass. In Fig. 1, I have shown both the caps 22 at opposite ends of the dowels provided with pads of compressible material, but if desired, the cushioning material may be provided in one of the pads only, in which case, the opposite end of the dowel may be firmly embedded in the concrete slab into which it extends as has heretofore been common practice.

The cross or support members 18 may be made of rods instead of tubing as shown at 32, and may be welded to the base member. The cross members whether made of rods or of tubing may, however, be secured to the base member, as shown in Figs. 4 and 5 in which the rod cross members 32 are held in place by integral portions of the upright members 15. As shown, the upright members 15 may have tabs 30 partly cut from the sides and/or bottom portions thereof, in which case, the base member 14 is provided with slots or openings 31 through which these tabs may extend. The tabs after being passed through the slots or openings are twisted through about 90 degrees and are then bent or wrapped partly around the cross member or support 18 or 32 to firmly hold the same in place with relation to the base member. Preferably, the tabs extending downwardly through openings 31 in the base member extend around the supports 18 or 32 from opposite directions as clearly shown in Fig. 5. By means of this construction, a two-fold purpose is accomplished, namely, of securing the upright members 15 to the base member as well as securing the cross members or supports to the base member. When this construction is employed, no welding is necessary on any part of the load transfer device. If due to rough handling or accident one or more tabs should become disconnected from the cross members, they can be easily connected therewith merely by use of pliers or a hammer.

Figure 6:
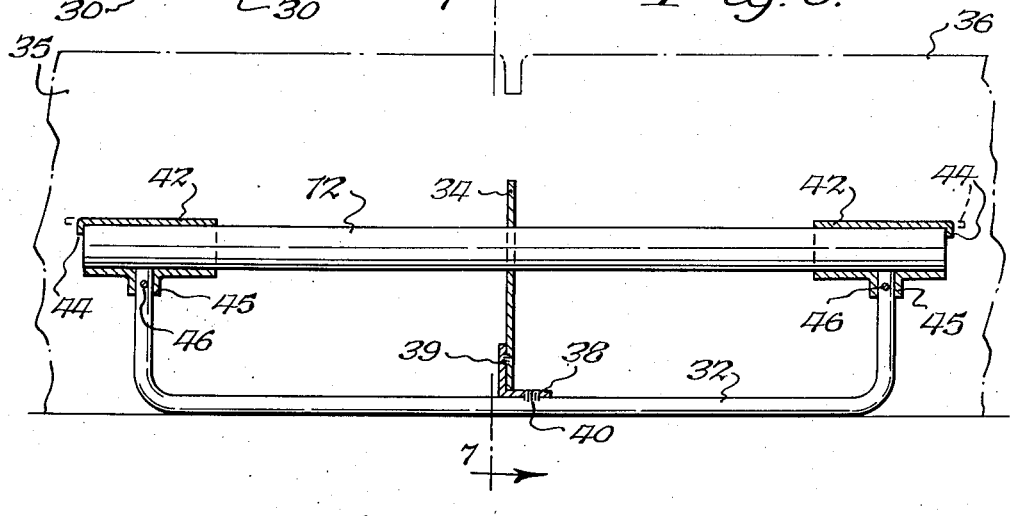
Fig. 6 is a transverse sectional elevation similar to that shown in Fig. 1, but showing my improvements applied to a contraction joint.
Figure 7:
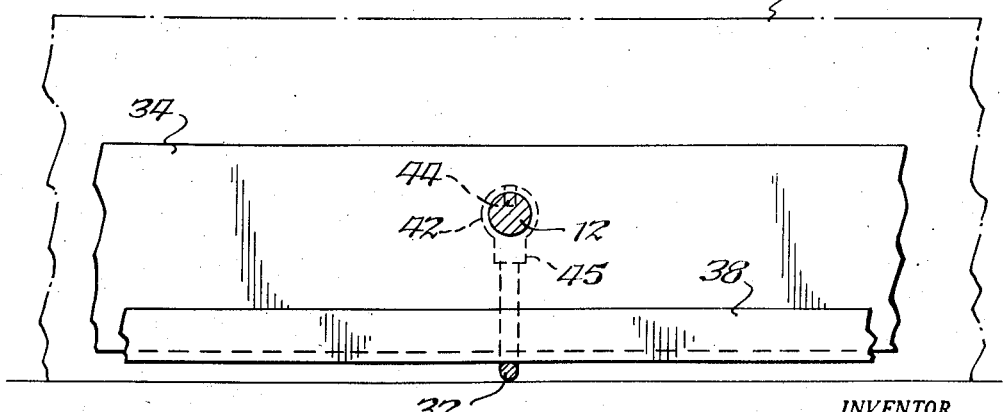
Fig. 7 is a longitudinal sectional elevation thereof, on line 7—7, Fig. 6.

My improvements are equally applicable to a contraction joint as shown in Figs. 6 and 7, in which case the upright members may be in the form of a single strip of metal 34 to be arranged between the meeting ends of the concrete slabs 35 and 36 to form a plane of weakness. In a case of this kind, it is not necessary that a channel-shaped base member be employed, and in Figs. 6 and 7 an angle bar 38 is shown for this purpose, to one leg of which the upwardly extending plate or member 34 may be welded or otherwise secured as shown at 39 and the support 18 may be similarly welded to the other leg of the base member as shown at 40. In case of a contraction joint, the caps 42 engaging the opposite ends of the dowels 12 may be of tubular or open-ended form, and in order to hold these caps in correct relation to the dowels and the supports 18, the ends of the caps 42 are preferably provided with short tabs 44 which initially extend straight outwardly from the cylindrical portions of these caps as illustrated in broken lines in Fig. 6, and which may be bent or hammered over against the ends of the dowels 12 to securely hold the dowels in place with relation to the supports 18.

If rods are used to form the support 32 in place of tubing, the caps 42 may be provided with integral outwardly extending sleeves or hollow lugs 45 formed to fit about the upper ends of the upright parts of the supports 32. These supports and the caps 42 may be secured in correct relation to each other by means of pins 46 extending through the lugs 45 and the upper ends of the supports 32. The dowels 12 extend through holes in the upright plates 34 and are held in correct relation to these plates by means of the tabs 44 of the sleeves or caps 42, which prevent endwise movement of the dowels relatively to the plates.

Figure 8:
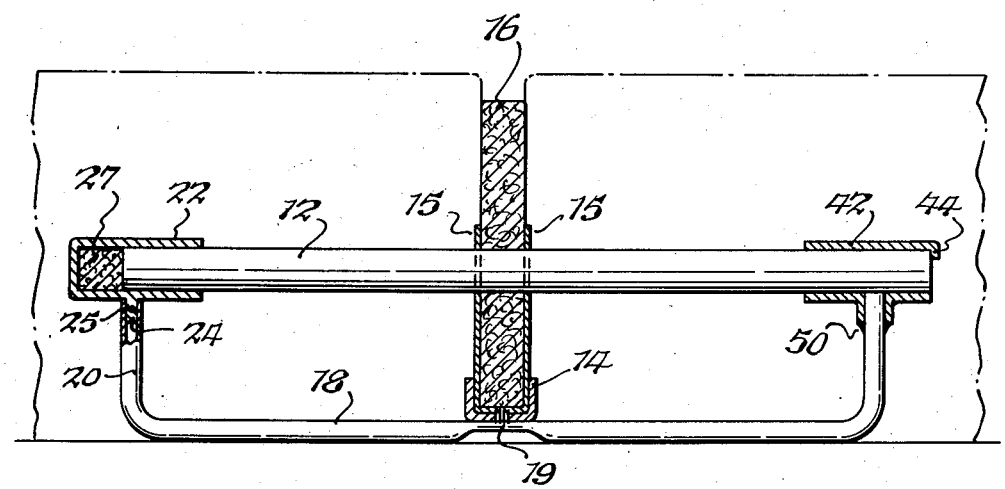
Fig. 8 is a transverse sectional elevation of a load transfer device of modified construction.

The load transfer member shown in Fig. 8 differs from the one shown in Figs. 1 and 6 in that it includes a cap 22 with a closed end and containing a resilient pad 27 at one end of the dowel, and a tubular part or cap 42 which, however, may be welded to the adjacent upwardly extending end of the cross member 18 as shown at 50. This tubular member 42 is provided with a short tab 44 which when originally made extends outwardly parallel to cap 42 so that the dowel 12 may be inserted through this cap 42 and through holes in the joint filler and through the upright arms 15 into engagement with the cushion member in the cap 22. The lug or tab 44 may then be hammered over to hold the dowel in place. If desired, a welded joint may also be provided for connecting the shell 22 to the other upwardly extending arm of the base member 18.

Figure 9:
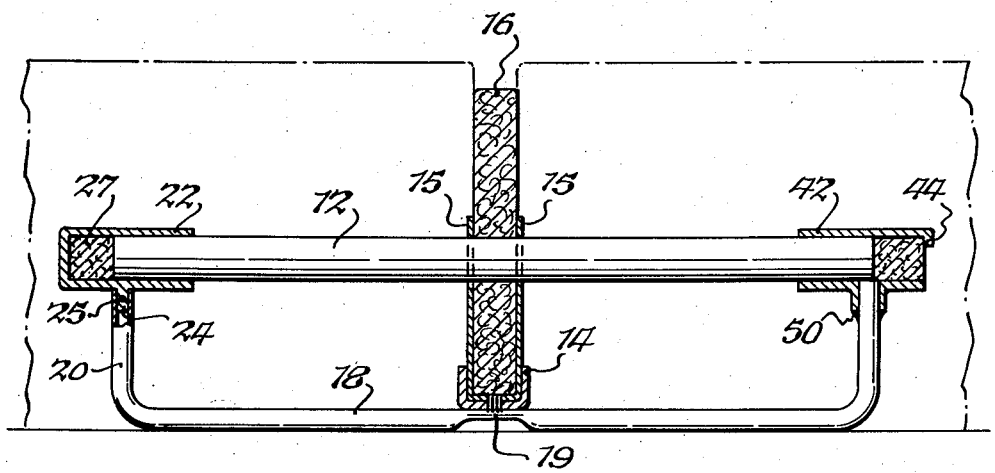
Fig. 9 is a transverse sectional elevation of a load transfer device of another modified construction.

The construction shown in Fig. 9 may be employed, if it is desired to use compressible cushions at opposite ends of the dowel 12, in which case, the lug 44 at the end of the cap or cylinder 42 may be bent over against a cushion member 52 after the dowel 12 has been inserted lengthwise through the cylinder 42 and into the cap 27 after having been passed through the holes in the joint filler 16 and the upright arms 15. By means of this construction, the caps 27 and 42 may be permanently secured or welded to the base member 18. This construction is particularly desirable for the reason that as the concrete hardens, one or other half of the dowel bar may freeze to a slab, in which case, either cushion may serve to permit movement of the dowel bar relatively to a slab.

In the use of the construction shown in Figs. 1 to 3, the supports 18 are welded to the base member 14 and the upright members 15 are also welded to the base member at the factory. The caps 22 and the dowels 12 are preferably sent separately for assembly to the support members 18 in the field. The joint filler 16 is punched with holes located correctly to receive the dowels 12 and the upright members 15 are also provided with holes for this purpose. When the joint filler is assembled in the field with the other parts of the load transfer device, it is inserted between the arms 15 and into the base member 14 in such a manner that the holes in the joint filler are in registration with the holes in the upright members 15. The dowels 12 may then be inserted through these holes and the caps 22 are applied to the ends of the dowels. The projections 24 of the caps are then positioned within the tubular upright arms 20 and secured in place, for example, by means of pins 25.

When the construction shown in Figs. 4 and 5 is employed, the entire assembly may take place in the field.

The construction shown in Figs. 6 and 7 may be assembled as described in connection with Figs. 1 to 3.

In the assembly of the parts as shown in Figs. 8 and 9 all of the metal parts may be assembled at the factory with the exception of the dowel bar 12 which is placed in its operative position after the joint filler has been positioned between the upright members 15, in which case, the dowel bar is merely inserted through the cap 42, then through the holes in the arms 15 and joint filler 16, and into the cap 27. The dowel is then secured in place by bending over the tip or extension 44 of the cap 42.

By means of the construction described, the relatively rigid base members 14 and 38 enable the assembled load transfer members to be picked up at their ends without serious flexing of the same, particularly because of the fact that the upright member 34 reinforces the angle bars 38 so that any deflection of the load transfer devices when picked up at their ends would be very slight, and not sufficient to break any of the welds or other connections between parts of the same. Similarly when the load transfer devices are loaded on trucks driving over rough ground, the rigidity of the base member together with that of the upright member 34 will prevent such twisting or bending of the load transfer devices as would break the welds or other connections. This construction, therefore, would avoid the expense of repairs of the load transfer devices after they have reached their destination. The horizontal lower parts of the supports 18 and 32 also serve to position the load transfer devices correctly on the subgrade of the highway so as to hold the joint filler 16 in an upright position and to hold the dowels 12 in substantially horizontal positions.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A load transfer device for a road joint between two adjacent pavement slabs, comprising a substantially rigid base member extending lengthwise of said device and having an upwardly extending flange and a horizontal flange, supports arranged at intervals lengthwise of said base member and extending transversely under the same, each of said supports including a substantially horizontal portion secured to said base member and formed to rest on a sub-grade of a pavement and provided with upwardly extending ends, a plurality of dowels arranged above said base, hollow tubular members into which the ends of said dowels fit, and connections between said upwardly extending ends of said supports and the tubular members for supporting said dowels in correct relation to said base said connections between the upwardly extending ends of the supports and the tubular members are in the form of lugs extending downwardly from said tubular members and tubular parts on the upper ends of said upwardly extending ends of said supports having telescopic connections with said lugs.

2. A load transfer device for a road joint between two adjacent pavement slabs, comprising a rigid base member extending lengthwise of said device and having webs extending horizontally and vertically to resist bending of said base, an upright member for positioning between pavement slabs and having the lower portion thereof rigidly secured to said base member to reinforce the same against bending and having holes therein spaced at intervals lengthwise thereof, a plurality of dowels extending through said holes in said upright member, a substantially U-shaped support for each dowel extending crosswise of said base member and having the middle portion thereof rigidly secured to the lower face of said base member and having the ends thereof extending upwardly into proximity to the ends of said dowels, tubular caps having a sliding telescoping connection with the ends of said dowels, a lug on each cap, and interfitting portions on each lug and on the upper end of said support for securing said caps on said supports.

3. A load transfer device for a road joint between two adjacent pavement slabs, comprising a substantially rigid base member extending lengthwise of said device and having an upwardly extending flange, supports arranged at intervals lengthwise of said base member and extending transversely beneath the same, each of said supports being made of tubing bent to form a substantially horizontal portion formed to rest on a sub-grade of a pavement and provided with upwardly extending ends, the middle of said horizontal portion being welded to the under surface of said base, a plurality of dowels arranged above said base, sleeves into which the ends of said dowels telescope, a lug on each sleeve extending laterally therefrom, and telescopic connections between said lugs and said upwardly extending ends of said supports for supporting said sleeves and said dowels in correct relation to said base, and a metal member extending upwardly from said base and secured thereto and supporting the middle portion of a dowel.

References Cited in the file of this patent

UNITED STATES PATENTS

| | | |
|---|---|---|
| 2,015,340 | Fischer | Sept. 24, 1935 |
| 2,150,982 | McFarland | Mar. 21, 1939 |
| 2,207,168 | Thomas | July 9, 1940 |
| 2,227,614 | Willard | Jan. 7, 1941 |
| 2,245,972 | Friberg | June 17, 1941 |
| 2,269,703 | Bagwill | Jan. 13, 1942 |
| 2,299,670 | Westcott | Oct. 20, 1942 |
| 2,325,472 | Brickman | July 27, 1943 |
| 2,589,815 | Jacobson | Mar. 18, 1952 |
| 2,608,142 | Jacobson | Aug. 26, 1952 |